E. H. SCHMIDT.
COUPLING SHANK AND YOKE CONNECTION.
APPLICATION FILED AUG. 24, 1915.

1,236,882.

Patented Aug. 14, 1917.

WITNESSES:
L. H. Latimer

INVENTOR
Ernest H. Schmidt
BY
Clarence Spence
ATTORNEY

UNITED STATES PATENT OFFICE.

ERNEST H. SCHMIDT, OF CLEVELAND, OHIO, ASSIGNOR TO THE NATIONAL MALLEABLE CASTINGS COMPANY, OF CLEVELAND, OHIO, A CORPORATION OF OHIO.

COUPLING-SHANK AND YOKE CONNECTION.

1,236,882.

Specification of Letters Patent.  Patented Aug. 14, 1917.

Application filed August 24, 1915. Serial No. 47,022.

*To all whom it may concern:*

Be it known that I, ERNEST H. SCHMIDT, a citizen of the United States, residing at Cleveland, Cuyahoga county, Ohio, have invented new and useful Improvements in Coupling-Shank and Yoke Connections, of which the following is a specification, reference being had to the accompanying drawings, in which—

Figure 1:
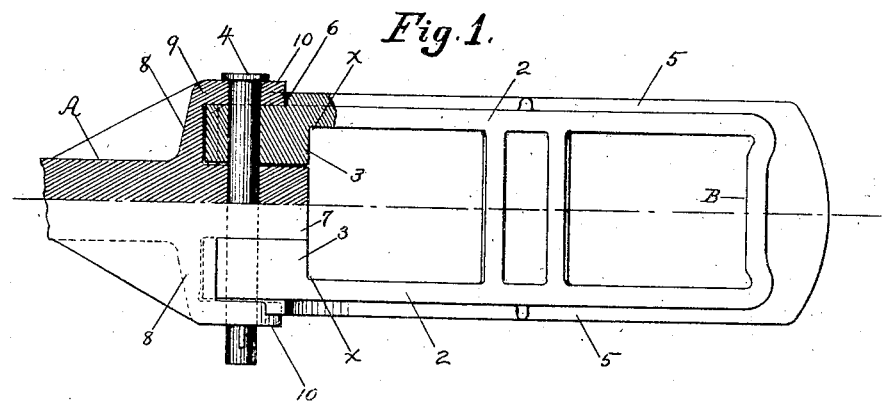
Figure 2:
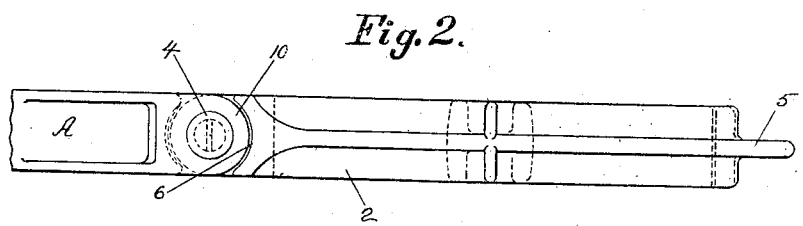

Figure 1 is an elevation partly in section, showing the application of my invention, and Fig. 2 is a plan thereof.

My invention relates to coupler shank and yoke connections, and is designed to provide a simple and convenient form of connection by which the parts can be readily disconnected, either by a straight rearward movement of the yoke or by a forward movement of the coupler shank, and permits the coupler to angle laterally relative to the yoke. My invention also consists in reinforcing the yoke to strengthen the junctures between the bosses at the forward end of the yoke and the yoke arms, and in providing buffing bearings on the yoke for the coupler shank, thereby to relieve the pivot pin from undue buffing stresses.

Referring to the drawings, A indicates a coupler shank and B the yoke, which is of U-shape, open at its forward end. The forward ends of the arms 2 of the yoke are in the form of enlarged bosses 3, which are of greater vertical depth than the thickness of the arms of the yoke so as to provide a substantial bearing for the body of the connecting pin or bolt 4. Extending around the yoke is a rib 5, which extends forwardly of the points of juncture between the arms 2, and the enlarged bosses 3, and thus provides a reinforcement which greatly strengthens the yoke and prevents failure at the junction points, which are indicated by the letter *x*. The rib 5, at its forward ends, is bifurcated and flared outwardly to form sockets or semi-circular bearings 6.

The coupler shank A has at its rearward end a central portion 7, adapted to enter between the bosses 3, apertured for reception of the pin 4, and projections 8 which have rearward extensions or lugs 9 overlapping the outside faces of the bosses 3, and having rounded rear ends 10 intended to buff against the sockets 6 in the ends of the rib 5. The extensions 9 are also suitably apertured for reception of the pivot pin 4. Particularly where my invention is used with a tandem yoke, such as is shown in the drawings, the bearing of the extensions 9 on the coupler against the sockets 6 of the yoke will transmit the buffing stresses to the yoke without placing undue strain upon the pivot pin.

The overlapping of the lugs 9 and the forward extensions of the rib 5 on the bosses 3 prevents the arms of the yoke, which are not connected at their forward ends, from spreading and thereby throwing so great a bending moment upon the pin or bolt as to cause it to bend.

The parts can be readily assembled and the construction is a very convenient one in facilitating car repairs. After removing the pin or bolt 4 the yoke and coupler can be disengaged, either by a straight rearward movement of the yoke or by the forward movement of the coupler shank. This enables the draft gear to be disengaged and to be dropped down from the car frame, by simply sliding the coupler forward to an extent sufficient to disengage it from the yoke.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

In a coupler shank and yoke connection, a draft rigging yoke having upper and lower arms and a vertical portion connecting said arms at their rear ends, the forward ends of said arms having integral enlarged bosses of greater vertical depth than the thickness of said arms, a rib extending around the exterior of said yoke and terminating on each arm at a distance forward of the juncture points between the bosses and the arms in a buffing bearing, a coupler shank seating between said bosses, the bosses having vertically-extending faces at their forward ends, and projections on the top and bottom of the coupler shank having rearwardly-extending lips overlapping the bosses, said rib and said overlapping lips being adapted to prevent the arms of the yoke from spreading, the bosses, coupler shank and overlapping lips being apertured for reception of a pivot pin, and the yoke and coupler shank being adapted to be disengaged after removal of the pin by a longitudinal movement of either of said members.

ERNEST H. SCHMIDT.